W. T. BRANITZKY.
ANIMAL TRAP.
APPLICATION FILED OCT. 30, 1912.
1,077,666.
Patented Nov. 4, 1913.
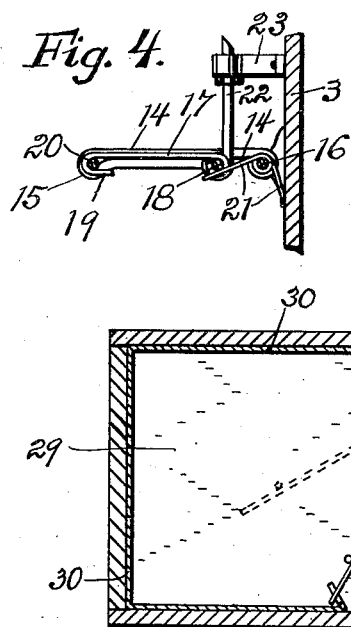
Fig. 4.
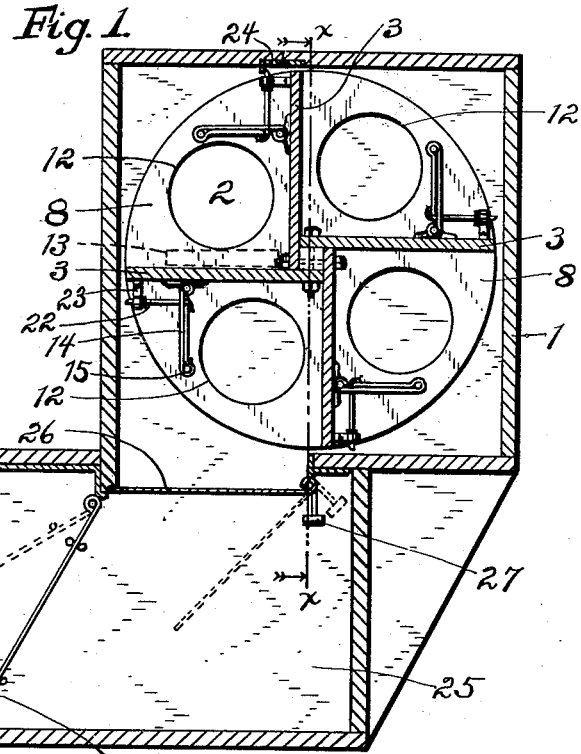
Fig. 1.
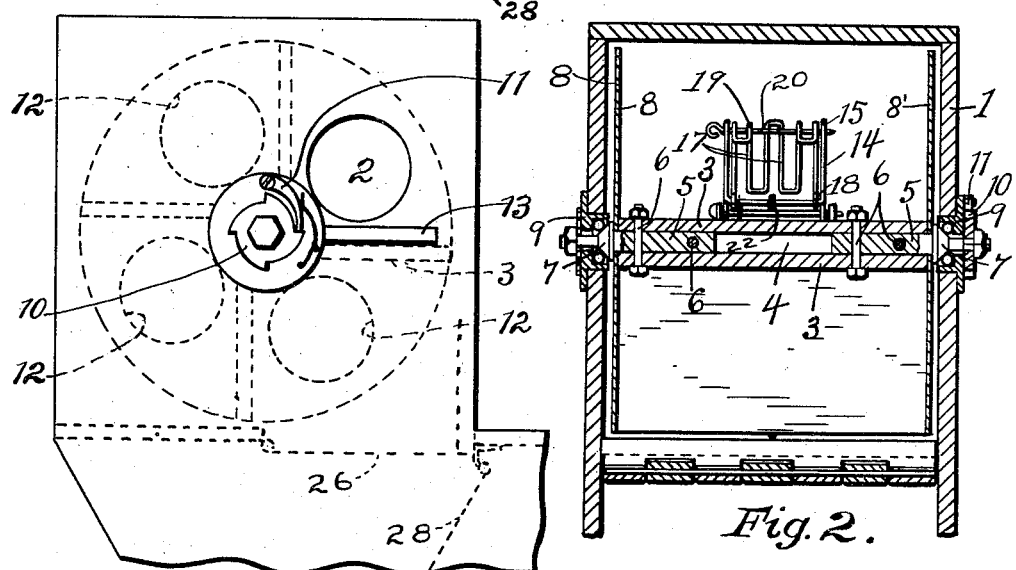
Fig. 3.
Fig. 2.
Witnesses:
Thomas Colson,
B. G. Richards
Inventor:
William Thomas Branitzky,
By Joshua R H Potts
his Attorney.
COLUMBIA PLANOGRAPH CO., WASHINGTON, D. C.

UNITED STATES PATENT OFFICE.

WILLIAM THOMAS BRANITZKY, OF CHICAGO, ILLINOIS, ASSIGNOR OF ONE-FOURTH TO JOSEPH HAUSLER, OF CHICAGO, ILLINOIS.

ANIMAL-TRAP.

1,077,666.  Specification of Letters Patent.  Patented Nov. 4, 1913.

Application filed October 30, 1912. Serial No. 728,534.

*To all whom it may concern:*

Be it known that I, WILLIAM THOMAS BRANITZKY, a citizen of the United States, and a resident of the city of Chicago, county of Cook, and State of Illinois, have invented certain new and useful Improvements in Animal-Traps, of which the following is a specification.

My invention relates to improvements in animal traps and has for its object the provision of an improved device of this character which is of simple construction and efficient in operation.

The invention consists in the combinations and arrangements of parts hereinafter described and claimed.

The invention will be best understood by reference to the accompanying drawing forming a part of this specification, and in which, Figure 1 is a vertical section of a trap embodying my invention, Fig. 2, a section taken on line *x—x* of Fig. 1, Fig. 3, a partial end view of the trap, and Fig. 4, a detail view of a bait holder employed in the trap.

The preferred form of construction, as illustrated in the drawing comprises a suitable casing 1 which is made of wood and is provided with an entry opening 2 in each end thereof. A rotatable member is arranged in casing 1 and consists of four longitudinally and radially extending partitions 3 arranged, as indicated to inclose a square space 4 at their inner ends, as shown. Shaft members 5 are placed in space 4 to project from each end thereof and are secured in position by means of bolts 6 passed through said shaft members and said partition members as shown. This arrangement constitutes an efficient and effective construction for the purpose, and one which may be readily assembled. Each of the shaft members 5 is provided with a conical flange 7 which serves as a part of a ball bearing and also as a means for holding end disks 8 and 8' in operative relation with partitions 3 so as to form a plurality of compartments open at their peripheries, but closed at each end and suitable ball bearings 9 are provided in casing 1 to coöperate with conical flange 7 so as to permit said rotatable member to rotate with but little friction. One of the shaft members 5 is extended somewhat and provided with a ratchet wheel 10 which coöperates with a pawl 11 to prevent retrograde movement of said rotatable member. The disks 8 and 8' are provided with four entry openings 12, one pair leading into each of the compartments in the rotatable member, and all of them arranged to register with openings 2 as said rotatable member rotates. Shelves 13 are arranged on the outside of casing 1 to facilitate the entry of animals through openings 2. Each of the compartments in said rotatable member is equipped with a bait holding device comprising a substantially U-shaped frame 14 which is made of a piece of wire bent, as indicated, and provided at the outer end of each of the sides of said frame with an eye 15. The frame 14 is pivoted at 16 to the corresponding partition 3 and another frame 17 is formed of a single piece of wire tortuously bent, as indicated, is pivoted at 18 in frame 14. The outer portion of frame 17 is provided with hooks 19 adapted to engage a sharpened pin 20 which is passed through the eyes 15 and said hooks. A spring 21 serves to hold the bait holder normally in the position indicated and each of the frames 14 carries an outwardly projecting lock-pin 22 which passes through a guide eye 23 secured to the corresponding partition 3. A stop 24 is also provided in casing 1 in position to be engaged by the pins 22 as the rotatable member rotates and stop such rotation with the corresponding entry opening 12 registering with entry opening 2 in the casing 1, ratchet wheel 10 being also so arranged as to hold the rotatable member in this position against retrograde movement.

An animal receiving chamber 25 is arranged below casing 1 and is provided with a downwardly swinging trap door 26 adapted to permit the passage of the animals from casing 1 and the rotatable member therein. Trap door 26 is provided with a counterweight 27 which serves to hold said trap door normally in closed position, but will yield to permit the passage of an animal therethrough. An upwardly swinging gate 28 leads from the chamber 25 into another receiving chamber 29 which is provided with a metallic lining 30 to prevent gnawing of rodents or other animals.

In use, each of the bait holders is provided with a piece of meat which may be readily and securely fastened between frames 14 and 17 and held in position by means of the pin 20. Then the trap is set with the parts in the position indicated in Fig. 1, with one pair of the openings 12 registering with the openings 2, as illustrated. When the animal enters the trap and attempts to withdraw the meat from the bait holder, pin 22 is drawn downwardly and the rotatable member is released. The weight of the animal then causes rotation of said rotatable member which causes the animal to be deposited on trap door 26 and pass thence into receiving chamber 25, trap door 26 automatically closing after such passage. The animal naturally passes into receiving chamber 29 where it will be held until disposed of as desired.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In an animal trap, the combination of a casing; a rotatable member mounted in said casing; a substantially U-shaped wire member having its legs rebent with the rebent portion extending beyond the bight portion thereof and pivotally connected with said rotatable member; bait holding means mounted between the legs of said wire member; and a locking bolt pivoted to the bight portion of said wire member and engaging said casing to lock said rotatable member, substantially as described.

2. In a trap, the combination of a casing; a rotatable member mounted in said casing; a substantially U-shaped wire member having its legs rebent with the rebent portion extending beyond the bight portion thereof and pivotally connected with said rotatable member; a bait holding wire bent with a plurality of portions in spaced parallel relation with each other and disposed between the legs of said U-shaped member with the ends thereof pivoted on the bight portion of said U-shaped member; hooks formed on said bait holding wire; a pin in the bight portions of said U-shaped member and said hooks; and a locking bolt pivoted to the bight portion of said wire member and engaging said casing to lock said rotatable member, substantially as described.

In testimony whereof I have signed my name to this specification in the presence of two subscribing witnesses.

WILLIAM THOMAS BRANITZKY.

Witnesses:
 JOSHUA R. H. POTTS,
 B. G. RICHARDS.

---

Copies of this patent may be obtained for five cents each, by addressing the "Commissioner of Patents, Washington, D. C."